United States Patent [19]

Kumakura

[11] Patent Number: 4,677,328
[45] Date of Patent: Jun. 30, 1987

[54] GENERATOR FOR USE ON BICYCLE

[75] Inventor: Kenkichi Kumakura, Tokyo, Japan

[73] Assignee: Rikichi Kumakura, Tokyo, Japan

[21] Appl. No.: 794,904

[22] Filed: Nov. 4, 1985

[30] Foreign Application Priority Data

Nov. 8, 1984 [JP] Japan .................. 59-168576[U]

[51] Int. Cl.4 .................................... H02K 7/00
[52] U.S. Cl. ..................... 310/67 R; 310/67 A; 310/156
[58] Field of Search ............ 310/67, 75 R, 75 C, 310/156, 67 A

[56] References Cited

U.S. PATENT DOCUMENTS 2,638,557  5/1953  Longert ................. 310/156 X
3,317,765  5/1967  Cone .................... 310/67 X
3,710,158  1/1973  Bachle et al. ........... 310/67 X Primary Examiner—Donovan F. Duggan
Attorney, Agent, or Firm—Jordan and Hamburg

[57] ABSTRACT

A generator has a rotor attached to one of a pair of spoke suspending hub flanges rotatably mounted on an axle of a bicycle and a stator fixedly mounted on the axle. The generator includes a hub drum having a disc portion and a rim portion, the disc portion being concentrically fixed on an outer surface of the one hub flange and formed at its central portion with a through hole through which the axle is rotatably inserted, the rim portion being integrally formed on an outer circumferential edge of the disc portion so as to project in the direction of an outer surface of the disc portion. An annular magnet assembly constituting the rotor is attached on an inner circumferential surface of the rim portion. A stationary drum constituted by a central portion fixed to the axle and a support rim portion integrally formed on a circumferential edge of the central portion supports a coil assembly constituting the stator such that an outer circumferential edge of the coil assembly is in opposition to an inner circumferential surface of the annular magnet assembly with a slight gap therebetween. Owing to this arrangement, the generator can be mounted on a bicycle without necessitating modification of a ready-made hub flange.

12 Claims, 5 Drawing Figures

GENERATOR FOR USE ON BICYCLE

BACKGROUND OF THE INVENTION

1. Field of the Invention

The present invention relates to a dynamoelectric machine or generator to be mounted on a bicycle (hereinafter referred to as "bicycle generator") at an axle portion of a wheel of the bicycle, and particularly to a bicycle generator arranged to be easily and surely mounted on a bicycle by using a ready-made spoke suspending hub flange of the bicycle.

2. Description of the Prior Art

It has been proposed to mount a generator on a bicycle at an axle portion of a wheel thereof as disclosed, for example, in U.S. Pat. No. 4,227,105 filed by Shokichi Kumakura and issued on Oct. 7, 1980. The generator is constituted by: a rotor constituted by an annular magnet assembly having a plurality of arcuate permanent magnets incorporated in one of a pair of hub flanges rotatably mounted on the wheel; and a stator constituted by a coil assembly attached to a support fixedly mounted on the axle and disposed within the annular magnet assembly concentrically therewith with a slight gap therebetween. In this generator, however, there is the disadvantage that the one hub flange must be formed in a special shape in order to attach the annular magnet assembly thereto, thus making it impossible to use a ready-made hub flange. Further, because the hub flange on which the generator is mounted becomes longer correspondingly, the spokes connected to the hub flange become shorter correspondingly so that it becomes necessary to support the wheel by means of two sets of spokes different in length from each other.

SUMMARY OF THE INVENTION

An object of the present invention is to provide a generator for use on a bicycle which can be easily attached to a ready-made hub wheel of the bicycle.

According to an aspect of the present invention, in a generator for use on a bicycle comprising a rotor constituted by an annular magnet assembly having a plurality of arcuate permanent magnets and attached to one of a pair of spoke suspending hub flanges rotatably mounted on an axle of the bicycle, and a stator constituted by a coil assembly mounted on the axle by fixing means for obtaining an induced voltage owing to the rotation of the rotor, the improvement is provided in which the generator further comprises: a hub drum constituted by a disc portion and a rim portion, the disc portion being concentrically fixed on an outer surface of the one hub flange and formed at its central portion with a through hole through which the axle is rotatably inserted, the rim portion being integrally formed on an outer circumferential edge of the disc portion so as to project in the direction of an outer surface of the disc portion, the annular magnet assembly being attached on an inner circumferential surface of the rim portion; and a stationary drum constituted by a central portion fixed to the axle by the fixing means and a support rim portion integrally formed on a circumferential edge of the central portion for supporting the coil assembly such that an outer circumferential edge of the coil assembly is in opposition to an inner circumferential surface of the annular magnet assembly with a slight gap therebetween.

In a preferred embodiment of the present invention, a boss portion is provided on an outer circumferential edge of the through hole in the disc portion of the hub drum, the boss portion being projected in the direction opposite to the projecting direction of the rim portion and formed on an annular projecting portion having a smaller diameter than that of the hub flange. The boss portion acts not only to seal a gap between a bearing portion of the hub flange and the axle but also to firmly fix the hub drum to the hub flange. A gap is formed between a spoke suspending portion of the hub flange and the disc portion because of forming the annular projecting portion, thereby making it possible to easily perform replacement of the spokes.

Other objects, features, and advantages of the present invention will become more apparent from the following detailed description of an embodiment illustrated in the accompanying drawings.

DETAILED DESCRIPTION OF PREFERRED EMBODIMENTS

Figure 1:
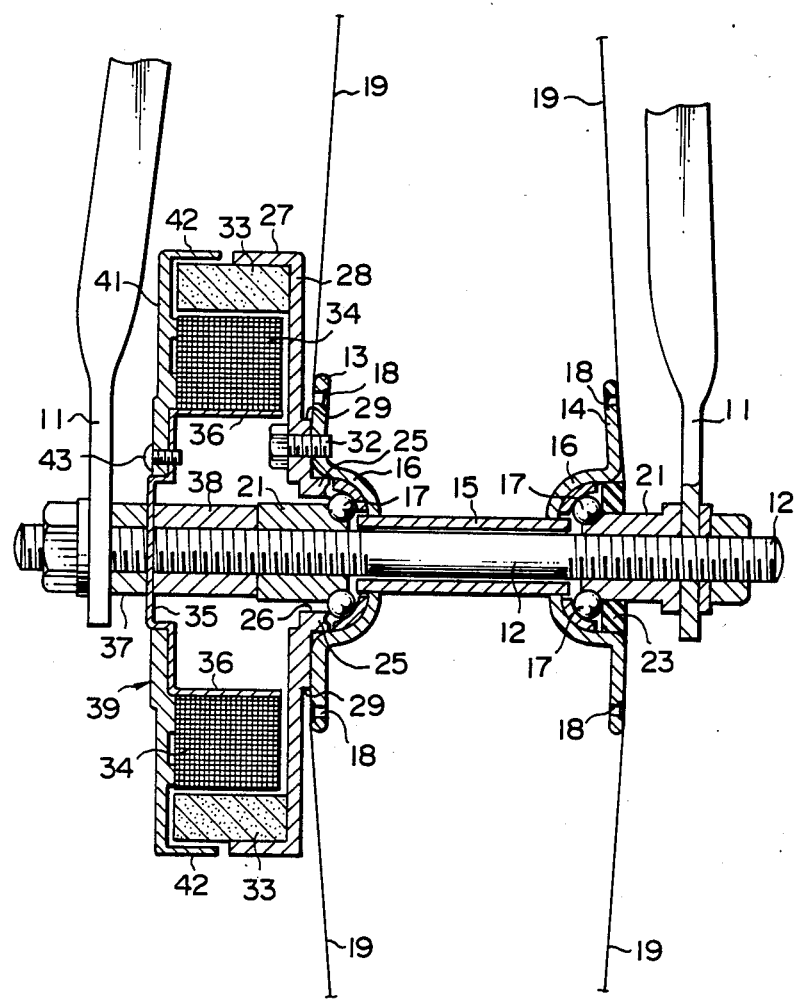
FIG. 1 is a side view partly in section showing an embodiment of the bicycle generator according to the present invention.

Referring to the drawings, an embodiment of the bicycle generator according to the present invention will now be described. In FIG. 1, shown are a pair of front fork blades 11 of a bicycle and a front wheel axle 12 fixedly supported at the opposite ends thereof by the fork blades 11. The axle 12 is inserted into a connecting pipe 15 and a pair of hub flanges 13 and 14 are concentrically attached to the connecting pipe 15 at the opposite ends thereof. Bowl-like portions 16 are respectively formed in the hub flanges 13 and 14 at their respective central portions, and attached to the connecting pipe 15 at the opposite end portions thereof so that the respective openings of the bowl-like portions 16 are made to face outward. The connecting pipe 15 is rotatably supported by the axle 12 through a pair of ball bearings 17 provided in the bowl-like portions 16 respectively. Through holes 18 are formed at suitable intervals in the outer circumferential portions of each of the hub flanges 13 and 14, so that one end of a spoke 19 is inserted in and fixed at each through hole 18. The axially outward movement of the hub flanges 13 and 14 is limited by a pair of fixing races 21 threaded onto the axle 12 for setting the respective ball bearings 17 in place.

Figure 2:
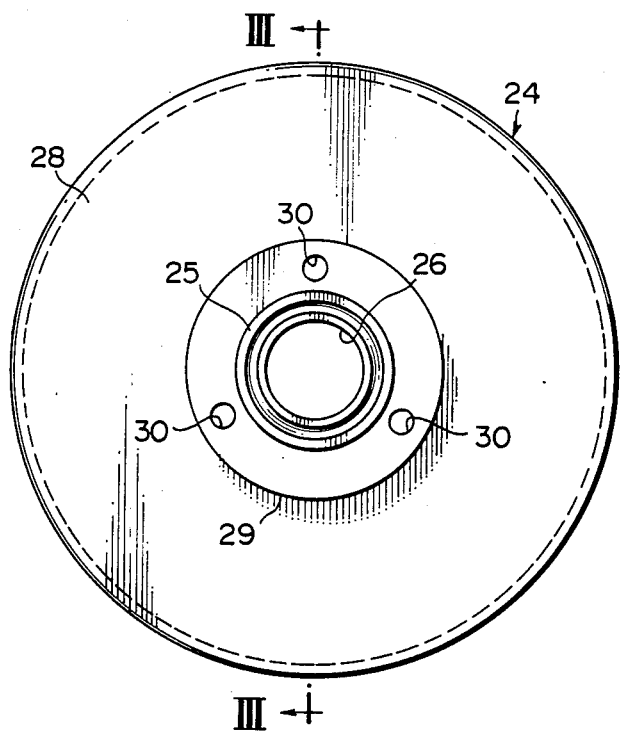
FIG. 2 is a plan view showing only the hub drum of FIG. 1.
Figure 3:
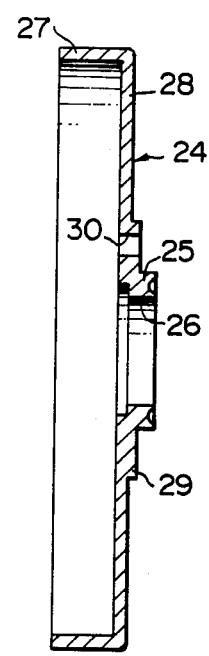
FIG. 3 is a longitudinal cross-section taken along a line III—III in FIG. 2.
Figure 4:
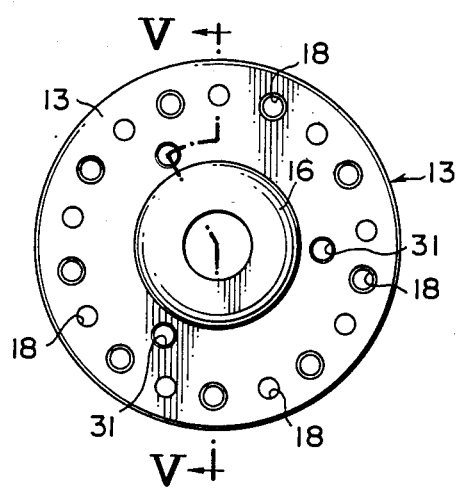
FIG. 4 is a plan view showing the hub flange of FIG. 1.
Figure 5:
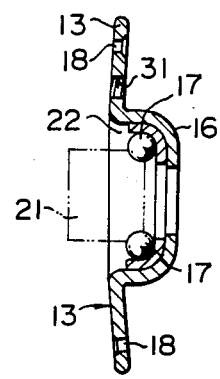
FIG. 5 is a longitudinal cross-section taken along a line V—V in FIG. 4.

An oil seal ring 23 is mounted in an annular gap 22 between the outer circumference of the fixing race 21 and the inner circumference of the bowl-like portion 16 at the hub flange 14 side. An annular boss portion 25 formed at the central portion of a hub drum 24 is fitted in another annular gap 22 at the hub flange 13 side. The hub drum 24 is made of a magnetic material and has a diameter larger than that of the hub flange. The boss portion 25 is integrally formed at the outer circumferential edge of an opening 26 of the hub drum 24 formed at the central portion thereof for the insertion of the fixing race 21. The top end of the boss portion 25 is inserted in the annular gap 22 to act as an oil seal ring. A rim portion 27 projected in the direction opposite to the projecting direction of the boss portion 25 is integrally formed on the hub drum 24 at the outer circumferential portion thereof. An annular projecting portion 29 projecting towards the boss portion 25 is formed on a disc portion 28 connecting the boss portion 25 and the rim portion 27 therebetween, in the vicinity of the boss portion 25. As shown in FIGS. 2 and 3, a plurality of through holes 30 are formed at suitable intervals in the annular projecting portion 29. As shown in FIGS. 4 and 5, the through holes 30 are arranged to coincide with corresponding through holes 31 formed in the hub flange 13, and fixing screws 32 are inserted in the through holes 30 and 31 so as to fix the hub drum 24 to the hub flange 13. As described above, because the boss portion 25 of the hub drum 24 is fixedly inserted into the annular gap 22, the hub drum 24 can be firmly connected with the hub flange 13.

An annular magnet assembly 33, constituting a rotor, is secured by adhesive bonding or the like to the inner circumferential surface of the rim portion 27 of the hub drum 24. In the annular magnet assembly 33, a plurality of arcuate permanent magnets are annularly disposed in an end-to-end relationship. Such an annular magnet assembly is disclosed in the above-mentioned U.S. Pat. No. 4,227,105 and the detailed description of it will be omitted. A coil assembly 34, constituting a stator, is disposed so as to be closely spaced from the inner circumferential surface of the annular magnet assembly 33. The coil assembly 34 is secured by adhesive bonding or the like to an annular outer circumferential surface of a support rim 36 provided onto a stationary drum 35 made of a non-magnetic material such as aluminum. The stationary drum 35 is fixedly supported between a fastening nut 37 threaded onto the axle 12 and an end of a spacer ring 38 which is threaded onto the axle 12 such that the other end thereof abuts on the fixing race 21. Because the arrangement of the coil assembly is also described in detail in the above-mentioned U.S. Pat. No. 4,227,105, the detailed explanation thereabout will be omitted here. A cover plate 39 is provided to cover the respective side surfaces of the annular magnet assembly 33 and the coil assembly 34 so as to prevent any foreign matter from entering a gap between the annular magnet assembly 33 and the coil assembly 34. The cover plate 39 has a disc portion 41 and a rim portion 42 formed on the outer circumferential edge of the disc portion 41. The disc portion 41 covers the axial fork side surface of the coil assembly 34 as well as the axial inner side surface of the annular magnet assembly 33 with a slight gap therebetween. The rim portion 42 covers the outer circumferential edge of the annular magnetic assembly 33 with a slight gap therebetween, and the edge of the rim portion 42 is in opposition to the edge of the rim portion 27 of the hub drum 24 with a slight gap therebetween. The disc portion 41 is fixed to the stationary drum 35 with bolts 43.

To mount the thus arranged generator onto an axle of a bicycle by the fixing means hereinafter described, first, the hub drum 24 provided with the annular magnet assembly 33 attached on the inner circumferential surface of the rim portion 27 thereof is attached to the outer surface of the hub flange 13. Next, the spacer ring 38 is threaded onto the axle 12 until the axial end of the spacer ring 38 comes into contact with the axial end of the fixing race 21. Finally, the stationary drum 35 provided with the coil assembly 34 is inserted onto the axle 12 to be in contact with the other end of the spacer ring 38 and fixed with the fastening nut 37. Thus, the generator is mounted on the axle 12. In this manner, the generator can be mounted onto a bicycle without requiring any modification of a ready-made hub flange of the bicycle. Although it is necessary to make the axle longer than the conventional one by an amount corresponding to the axial length of the generator, such an elongated axle may be provided extremely easily and inexpensively.

In the bicycle generator, the hub drum 24 supporting the annular magnet assembly 33 rotates together with the hub flange 13. On the other hand, the coil assembly 34 is attached to the stationary drum 35 fixed to the axle 12, so that the coil assembly 34 never rotates. Accordingly, the rotation of the annular magnet assembly 33 gives a magnetic field to the coil assembly 34, which constitutes a stator, concentrically disposed in the inside of the annular magnet assembly 33, resulting in an induced voltage across the coil assembly 34.

While the present invention has been specifically illustrated and described with reference to a preferred embodiment thereof, it will be obvious to those skilled in the art that various changes in shape as well as details can be made in the embodiment without departing from the spirit and scope of the present invention.

What is claimed is:

1. A generator for use on a bicycle, comprising
a rotor assembly comprising an annular magnet assembly having a plurality of arcuate permanent magnets for attachment to an outside surface of a first of a pair of spoke-suspending hub flanges rotatably mounted on an axle fixedly supported at opposite ends thereof by first and second fork blades of the bicycle;
a stator assembly comprising a coil assembly; and
fixing means for mounting the stator on the axle between said first hub flange and said first fork blade, said first hub flange and said first fork blade being located on a same end of said axle, whereby an induced voltage is obtained by rotation of the rotor assembly about the stator assembly;
said rotor assembly further comprising a hub drum having a disc portion and a rim portion, said disc portion being adapted to be concentrically fixed to the outer surface of said first hub flange, said disc portion including a central portion having a through hole for rotatable insertion of said axle therethrough, said disc portion having an inner surface facing the outer surface of said hub flange, an outer surface facing away from the outer surface of said hub flange and a circumferential edge, said rim portion being integrally formed on the outer circumferential edge of said disc portion for projecting away from the outer surface of said disc portion, said rim portion having an inner circumferential surface, said annular magnet assembly being attached to the inner circumferential surface of said rim portion; and
said stator assembly further comprising a stationary drum having a central portion adapted to be fixed to said axle, said stationary drum central portion having a circumferential edge, and a support rim portion integrally formed on said circumferential edge of said stationary drum central portion for supporting said coil assembly within and in opposition to said annular magnet assembly while forming a slight gap therebetween.

2. A bicycle generator according to claim 1 further comprising a boss portion provided on an outer circumferential edge of said central portion through hole of said disc portion, said boss portion projecting in a direction opposite to the projecting direction of said rim portion, said boss portion forming a seal for a gap formed between said axle and a bearing portion of said first hub flange when the generator is mounted on said first hub flange.

3. A bicycle generator according to claim 1, wherein the central portion of said disc portion further comprises an annular projecting portion provided circumferentially about said through hole for abutting the outside surface of said first hub flange when the generator is mounted on said first hub flange, said annular projecting portion having a diameter smaller than a diameter of said first hub flange, whereby the inner surface of said disc portion is disposed in opposition to the outside surface of said first hub flange with a slight gap therebetween when said generator is mounted on said first hub flange.

4. A bicycle generator according to claim 1, wherein said fixing means comprises a threaded axle, a fixing race for setting ball bearings in place within said first hub flange, a spacer ring and a fastening nut, said fixing race, spacer ring and fastening nut being threaded onto said threaded axle in end-to-end relationship from said first fork blade to said first hub flange.

5. A bicycle according to claim 2, wherein said boss portion further comprises a top end and an annular outer circumferential surface around the top end, and said fixing means has a hub flange portion for threading on the axle, whereby when the generator is mounted on the first hub flange, the annular outer circumferential surface of the boss portion slidably engages an annular inner circumferential surface of a bowl-shaped portion of said first hub flange defining a bowl-shaped cavity in said first hub flange, the hub flange portion of said fixing means being threaded along said axle into said cavity and the top end of said boss portion engaging a gap in said cavity defined by the hub flange portion of said fixing means and the bearing portion of said first hub flange to act as an oil seal ring for said gap.

6. A bicycle generator according to claim 5, wherein said fixing means comprises a fixing race for setting ball bearings in place within the bearing portion of said first hub flange, a spacer ring and a fastening nut, said fixing race constituting said hub flange portion of said fixing means for threading on the axle, and the top end of said box portion engages a gap in said cavity defined by the fixing race and the bearing portion of said first hub flange to act as said oil seal ring for said gap.

7. A bicycle generator according to claim 1 further comprising a cover plate attached to said stationary drum to cover exposed side surfaces of said annular magnet assembly and coil assembly.

8. A bicycle generator according to claim 2 further comprising a cover plate attached to said stationary drum to cover exposed side surfaces of said annular magnet assembly and coil assembly.

9. A bicycle generator according to claim 3 further comprising a cover plate attached to said stationary drum to cover exposed side surfaces of said annular magnet assembly and coil assembly.

10. A bicycle generator according to claim 4 further comprising a cover plate attached to said stationary drum to cover exposed side surfaces of said annular magnet assembly and coil assembly.

11. A bicycle generator according to claim 5 further comprising a cover plate attached to said stationary drum to cover exposed side surfaces of said annular magnet assembly and coil assembly.

12. A bicycle generator according to claim 6 further comprising a cover plate attached to said stationary drum to cover exposed side surfaces of said annular magnet assembly and coil assembly.

* * * * *